United States Patent [19]

Ladany

[11] 4,265,699
[45] May 5, 1981

[54] ETCHING OF OPTICAL FIBERS

[75] Inventor: Ivan Ladany, Stockton, N.J.

[73] Assignee: RCA Corporation, New York, N.Y.

[21] Appl. No.: 36,058

[22] Filed: May 4, 1979

[51] Int. Cl.³ .................. B44C 1/22; C03C 15/00; C03C 25/06

[52] U.S. Cl. .................. 156/657; 65/31; 156/663; 252/79.3; 350/96.18

[58] Field of Search ............... 156/639, 645, 655, 657, 156/663, 667; 65/31, 4 B; 350/96.18, 96.20, 96.29, 96.32, 96.33; 252/79.3

[56] References Cited

U.S. PATENT DOCUMENTS

| | | | |
|---|---|---|---|
| 2,479,286 | 10/1949 | Wolfskill | 156/645 X |
| 3,551,228 | 12/1970 | Meth | 252/79.3 X |
| 3,883,353 | 5/1975 | Cohen et al. | 96/38.3 |
| 4,040,893 | 8/1977 | Ghezzo | 252/79.3 |
| 4,040,897 | 8/1977 | Blish et al. | 156/656 |
| 4,118,270 | 10/1978 | Pan et al. | 156/659 |
| 4,193,663 | 3/1980 | Timmermann | 350/96.18 |

OTHER PUBLICATIONS

Applied Optics, vol. 15, No. 10, Oct. 1976, Highly Efficient Light Coupling from GaAlAs Lasers into Optical Fibers, by C. C. Timmermann, pp. 2432-2433.

IBM Technical Disclosure Bulletin, vol. 20, No. 3, Aug. 1977, Fabrication of Lenses on Tips of Fibers, by Crow et al., pp. 1235-1236.

*Primary Examiner*—William A. Powell
*Attorney, Agent, or Firm*—Birgit E. Morris; William J. Burke

[57] ABSTRACT

A method for reducing the diameter of the end of an optical fiber while leaving the fiber end flat or slightly concave so that a lens can be formed thereon. The fiber end is etched in a solution of aqueous hydrofluoric acid to which is added ammonium fluoride, ammonium bifluoride or a combination thereof.

5 Claims, 3 Drawing Figures

ETCHING OF OPTICAL FIBERS

The Government has rights in this invention under Contract No. N00173-77-C-0136 issued by the Department of the Navy.

The invention is a method for etching a single mode optical fiber to reduce its diameter while leaving the fiber end suitable for the formation of a positive lens thereon.

BACKGROUND OF THE INVENTION

Optical communication systems are rapidly becoming of increased and military importance. These systems convert an electrical signal to a modulated light signal using a light emitting diode or an injection laser. This light signal is transmitted along a plastic or glass optical fiber to a light detector such as a photodiode where the light signal is reconverted to an electrical signal. The highest bandwidth optical communication systems use an injection laser as a light source, a single mode fused silica optical fiber as the transmission medium, and an avalanche or p-i-n photodiode as the light detector. Single mode optical fibers are required in such systems to eliminate the dispersion resulting in multimode optical fibers from the different path lengths for the different simultaneously propagating modes. One class of single mode optical fibers is comprised of a doped fused silica core, typically about 5 microns in diameter, surrounded by a first cladding of borosilicate glass about 22 microns thick and a second cladding of fused silica, typically about 15 microns thick. A protective coating of an organic material, typically 10 to 15 microns thick, surrounds the cladding. A second class of single mode optical fiber is comprised of a doped fused silica core about 5 microns in diameter surrounded by a fused silica cladding about 35 microns thick.

The borosilicate glass cladding has an optical index of refraction at the wavelength of the propagating light which is less than that of the core. Light rays which strike the interface between the core and the first cladding at an angle of incidence less than the critical angle for total internal reflection are partially transmitted through the interface and are lost; while those that are incident at an angle greater than the critical angle are totally reflected at this interface and propagate along the fiber. The energy in the light beam is primarily concentrated in the core with the remainder propagating as an evanescent wave in the cladding. Single mode optical propagation in an optical fiber is obtained by reducing the diameter of the fiber core until only a single mode can propagate and all other modes are lost by transmission through the interface.

The amount of light which can be coupled into the optical fiber is limited by the light source size and the angular distribution of its output and by the area and acceptance angle or numerical aperture of the fiber core. To improve the coupling of light into the fiber it has been found to be useful to form a small f-number positive lens directly on the end of the optical fiber. Pan et al, U.S. Pat. No. 4,118,270 issued Oct. 3, 1978, incorporated herein by reference, have disclosed two methods for forming a positive lens on the end of an optical fiber. The first method is to form a hemispherical end on the fiber by etching the end in hydrofluoric acid. The second method is to dip a flat fiber end into a light transmissive epoxy resin, allowing surface tension and gravity to form a drop of the desired shape, either a hemispherical or hyperbolic shape. Upon hardening of the epoxy resin the desired lens is formed.

Either of these approaches results in a small f-number positive lens and will provide improved light coupling efficiency for multimode optical fibers with a large core diameter and a small cladding thickness. For the converse case of a single mode optical fiber where the core diameter is small and the cladding thickness is large, a large f-number lens results using this process and the resultant improvement in light coupling is much smaller. This result occurs because the radius of curvature of the lens formed and, thus, its focal length, is determined principally by the diameter of the large cladding region and not by the active core region into which it is desired to couple the light.

Timmerman, Applied Optics, Vol. 15, page 2432 (1976), has disclosed a three step technique of etching the end of the fiber to reduce its overall diameter, cutting the fiber end to provide a flat surface at the fiber end and positioning a low melting temperature lens on the fiber end. Reducing the diameter of the fiber end increases the radius of curvature of the lens formed, thus decreasing the focal length and the f-number of the lens formed by the technique of Pan et al. This significantly increases the efficiency of coupling of light into the single mode fiber.

Cohen et al, U.S. Pat. No. 3,883,353 issued May 13, 1975, have disclosed a photolithographic method to shape the ends of two cladded core fibers to form a high efficiency male to female connection between them. The portion of the fiber end to be etched is defined by using standard photolithographic techniques and an etchant such as hydrofluoric acid to remove the undesired material.

SUMMARY OF THE INVENTION

The invention is a method for etching the end portion of a single mode optical fiber in which the steps of removing a portion of the cladding by chemical etching the end of the optical fiber and cutting the fiber to form a flat end face is replaced by the single step of etching the fiber in a solution of aqueous hydrofluoric acid to which is added one or more compounds selected from the group consisting of ammonium fluoride, hereinafter NH$_4$F, and ammonium bifluoride, hereinafter NH$_4$HF$_2$, whereby a portion of the cladding is removed while leaving the fiber end flat or slightly concave, thus eliminating the step of cutting the fiber.

DETAILED DESCRIPTION OF THE INVENTION

Figure 1:
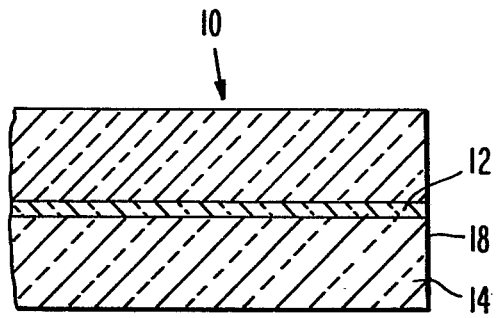
FIG. 1 is a schematic illustration of a side view of the end of a single mode optical fiber.

FIG. 1 shows a side view of the end of an optical fiber 10. The optical fiber 10 is comprised of a core region 12 and a cladding region 14. The end face 18 of the optical fiber is flat and is perpendicular to the optical fiber axis. A protective coating of organic material which covers the cladding is not shown and is assumed to have been removed from the end region of the optical fiber. The core region is typically about 5 microns in diameter. The cladding region 14 is typically about 37 microns thick, giving an overall diameter of about 80 microns. The thickness of the cladding is not critical for a single mode optical fiber so long as it is thick enough to provide the required mechanical strength.

Figure 2:
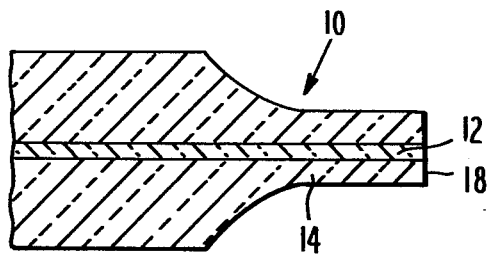
FIG. 2 is a schematic illustration of a side view of the end of a single mode optical fiber after a portion of the cladding has been removed.

FIG. 2 shows a side view of the end of a single mode optical fiber 10 after chemical etching using the method of the invention. A portion of the cladding 14 near the end face 18 has been removed by chemical etching leaving the diameter in this region slightly larger than the diameter of the core region 12, while the end face 18 remains flat or slightly concave.

Figure 3:
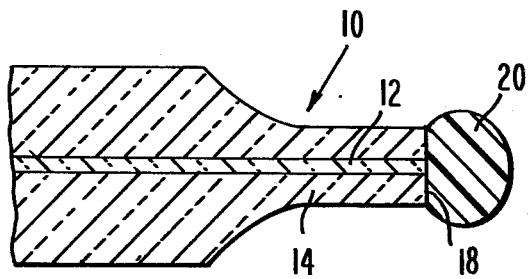
FIG. 3 is a schematic illustration of a side view of the end of a single mode optical fiber after a portion of the cladding has been removed and a lens has been formed on the fiber end.

FIG. 3 shows a side view of the end of a single mode optical fiber 10 after chemical etching of the cladding 14 to narrow the fiber diameter and the forming of the lens 20 on the end face 18.

The invention is a method for forming a low f-number positive lens on the end of a single mode optical fiber which combines the prior art steps of etching the fiber end and cutting the fiber end into a single etching step. I have found that when the end of a single mode optical fiber, having a doped fused silica core and glass cladding, is etched in a solution of aqueous hydrofluoric acid, and $NH_4F$, $NH_4HF_2$ or a combination of $NH_4F$ and $NH_4HF_2$, the fiber diameter is reduced and the fiber end is flat or slightly concave. In particular, if about 0.17 to about 0.25 gram of $NH_4F$ or about 0.40 to 0.46 gram of $NH_4HF_2$ is added to a one cubic centimeter of a 49% aqueous hydrofluoric acid solution, the resulting solution will etch the optical fiber cladding and end face in such a manner as to leave the end face flat or slightly concave while the diameter of the cladding is reduced. If the amount of $NH_4HF_2$ added to the solution is greater than about 0.48 gram per cubic centimeter of a 49% aqueous hydrofluoric acid solution, the end face becomes convex and ultimately forms a point on the fiber end. Conversely, if the amount of $NH_4HF_2$ is less than about 0.4 gram per cubic centimeter of the above solution, then the surface becomes strongly concave. Similarly, if the amount of $NH_4F$ added to the solution is less than about 0.17 gram per cubic centimeter of the above solution, then the fiber end becomes strongly concave; and if the amount of $NH_4F$ is greater than about 0.29 gram per cubic centimeter of the above solution, then the fiber end becomes convex.

If the optical fiber end face is flat the lens subsequently formed on the end face is a plano-convex positive lens which will collect and focus light into the fiber core. If the optical fiber end face is slightly concave the resulting lens is bi-convex with some small additional focusing action at the interface between the lens and the optical fiber end. If the fiber end becomes strongly concave the resultant convex-convex lens will provide strong focusing action at the optical fiber end-lens interface which will produce loss of light into the cladding material. If the optical fiber end is convex the resulting convex-concave lens with its defocusing action at the optical fiber end-lens interface will produce a decrease in the amount of light which can be coupled into the fiber.

The magnitude of the fiber diameter reduction is determined by the time duration of the etching process. Typically, about 15 to 20 minutes immersion in the etching solution will result in the reduction of the diameter from about 80 microns to about 35 microns. A greater reduction can be obtained by immersion in the etching solution for a longer period of time. Diameters reduced to about 15 microns with a flat or slightly concave end face have been obtained.

The etching process described above does not produce the same result for optical fibers having a doped fused silica core and a fused silica cladding. Chemical etching in solutions with concentrations of $NH_4F$ or $NH_4HF_2$ different from those disclosed here may provide the same effect for this optical fiber.

A lens may be formed on the end face using a transparent material such as a cureable epoxy resin on a polymeric precursor such as polymerizable acrylic polyester which is initially a liquid and will cure or harden. The lens may be formed using a method such as that disclosed by Pan et al. The transparent material adhering to the fiber end face will assume a convex shape due to surface tension and results, after hardening, in a rigid low f-number positive lens attached to the fiber end face.

Chemical etching in solutions outside of the ranges of $NH_4F$ or $NH_4HF_2$ disclosed herein to produce a suitable end face may also have utility. In particular, after the fiber diameter has been reduced while leaving the end flat, by etching in the disclosed solution, further etching in a solution containing more than about 0.48 gram of $NH_4HF_2$ or more than about 0.29 gram of $NH_4F$ per cubic centimeter of the concentrated aqueous hydrofluoric acid solution may be used to obtain beam focusing effects.

EXAMPLE 1

The diameter of the end of a single mode optical fiber having a fused silica core and borosilicate glass and fused silica claddings was reduced while leaving the end face flat using the following procedure.

The protective chemical overcoat was removed from a type T-110 single mode optical fiber manufactured by the International Telephone and Telegraph Company, Roanoke, Va. This fiber had a 5 micron diameter doped fused silica core region and an about 22 micron thick borosilicate glass first cladding and an about 15 micron thick fused silica second cladding, yielding an overall diameter of about 80 microns. An end of the fiber having a flat end face was then immersed in a solution containing about 0.46 gram of $NH_4HF_2$ per cubic centimeter of a concentrated 49% aqueous hydrofluoric acid solution. After etching at room temperature for about 16 minutes the fiber was withdrawn. The fiber end had a reduced diameter of about 35 microns and had a flat end face.

EXAMPLE 2

A single mode optical fiber similar to that used in Example 1 was immersed in a solution containing 0.25 gram of $NH_4F$ per cubic centimeter of a 49% aqueous hydrofluoric acid solution. After etching in this solution for 18 minutes the fiber was withdrawn from the solution. The fiber end diameter was reduced to 31 microns and had a flat end face.

EXAMPLE 3

A fiber such as described in Example 1 having the diameter of the end portion reduced from about 80 microns to about 30 microns and a flat end face was immersed in a Castolite Liquid Casting Plastic AP resin manufactured by the Castolite Company, Woodstock, Ill., and then withdrawn. The resin adhering to the fiber end was then allowed to cure overnight. The fiber end with lens attached in this manner was then brought into close proximity and aligned to the emitting facet of a gallium arsenide-aluminum gallium arsenide double heterojunction injection laser. About 30% to 70% of the light emitted by the injection laser was coupled into the single mode optical fiber depending on the near field spot size of the laser. This is to be compared with about 5 to 10% coupling typically obtained in the absence of the lens.

I claim:

1. A method of etching a single mode optical fiber comprising a fused silica core with a borosilicate glass cladding and having a flat end face whereby a portion of the cladding is removed while leaving the end face flat or slightly concave which consists essentially of etching an end portion of the fiber in a concentrated aqueous hydrofluoric acid solution containing an amount of ammonium fluoride, ammonium bifluoride or mixtures thereof effective for reducing the diameter of the fiber while leaving the end face flat or slightly concave.

2. In a method for forming a lens on the end of a single mode optical fiber comprising a fused silica core and a borosilicate glass cladding having a flat end face which comprises removing a portion of the cladding by chemical etching of an end portion of said fiber, cutting said end portion to form a flat end face thereon and forming a lens on the flat end face of said fiber, the improvement which consists essentially of etching said end portion in a concentrated aqueous hydrofluoric acid solution containing an effective amount of ammonium fluoride, ammonium bifluoride or mixtures thereof whereby a portion of said cladding is removed while leaving said end face flat or slightly concave thereby eliminating the step of cutting said end portion to form a flat end face thereon.

3. A method according to claim 1 or 2 wherein said etching solution consists of about 0.40 to about 0.46 gram of ammonium bifluoride per cubic centimeter of concentrated aqueous hydrofluoric acid solution.

4. A method according to claim 1 or 2 wherein said etching solution consists of about 0.17 to about 0.25 gram of ammonium fluoride per cubic centimeter of a concentrated aqueous hydrofluoric acid solution.

5. A method according to claim 1 or 2 wherein said concentrated aqueous hydrofluoric acid solution consists of about 48 to 51% by weight hydrofluoric acid.

* * * * *